Figure 1:
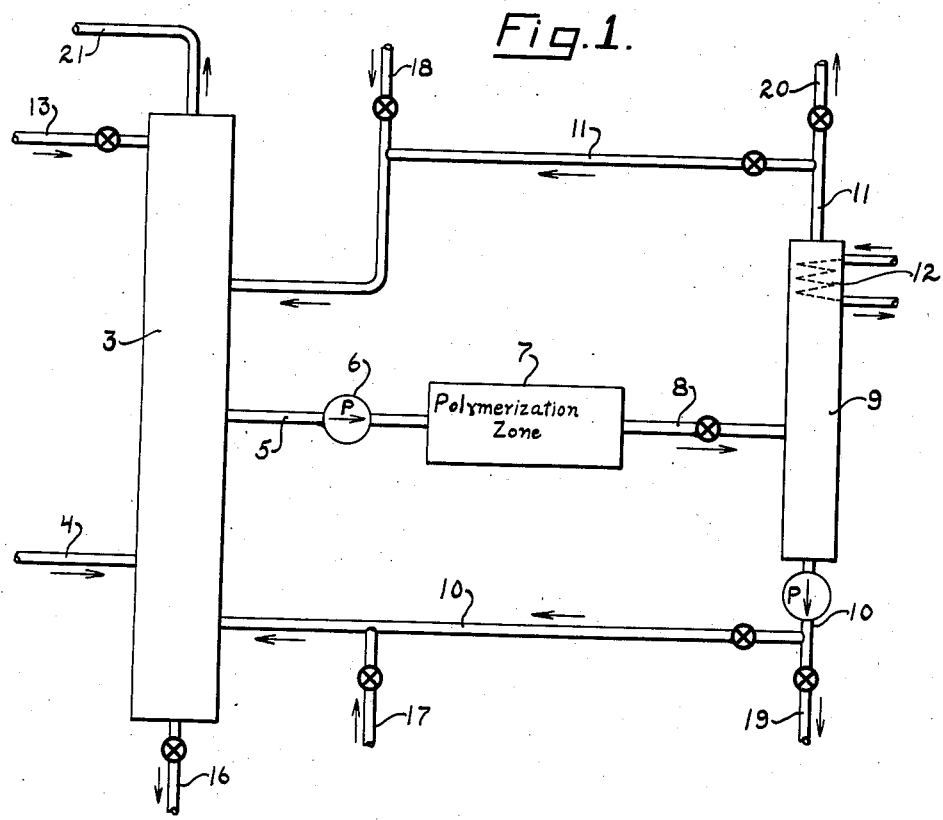

Nov. 21, 1939.   R. C. LASSIAT   2,180,361
SEPARATION AND TREATMENT OF FLUIDS
Filed March 1, 1937

INVENTOR
Raymond C. Lassiat
BY
Ira L. Nickerson
ATTORNEY

Patented Nov. 21, 1939

2,180,361

UNITED STATES PATENT OFFICE 2,180,361

SEPARATION AND TREATMENT OF FLUIDS

Raymond Charles Lassiat, Swarthmore, Pa., assignor to Houdry Process Corporation, Wilmington, Del., a corporation of Delaware Application March 1, 1937, Serial No. 128,394

4 Claims. (Cl. 196—10)

The present invention relates to the separation from composite materials having a substantial boiling range of one or more portions thereof having a restricted boiling range. More particularly, it is concerned with separation of desired material from a composite mixture containing it and higher boiling components. It is directed particularly toward such separation by fractional distillation.

When desired lower boiling constituents are separated from higher boiling portions of a composite material in a distillation or fractionating zone and the higher boiling portions are withdrawn from the zone at a level below that of admission of the composite material thereto, the higher boiling portions comprise an equilibrium mixture which is saturated with the lower boiling constituents at the temperature and pressure existing at the point of exit of the higher boiling portions from the zone. In instances where the boiling point or range of the lower boiling fraction is close to the boiling point or range of the higher boiling material, as is often the case in the fractionation of composite hydrocarbon mixtures, and such fraction comprises or contains desired starting material for a chemical process, such for example, as polymerization of unsaturated hydrocarbons, the substantial amounts of such fraction which remain dissolved in the higher boiling material are lost to the process. When the desired fraction is removed from the fractionating zone as a side stream, portions of the desired material in the charge tend to pass the level from which the side stream is removed to provide constituents for the equilibrium mixture above that level.

One object of the invention is to segregate desired portions of a composite charging material in a distillate fraction having a boiling range suitable for including such portions. Another object is to concentrate material having a predetermined boiling range and which is included in a composite mixture containing higher boiling and/or lower boiling components in a distillate derived from such mixture. Another object is to provide an improved method for providing charge for polymerization zone and for economically handling reaction products from the latter. Another object is to provide apparatus capable of effecting the above objects. Other objects will be apparent from the detailed discussion which follows.

The invention involves removing material of desired boiling range from a fractionating zone as a distillate, and adding to that zone, at a level adjacent but preferably below that for feed or admission of the composite mixture thereto, a stream of fluid containing sufficient material having approximately the boiling range of the distillate to meet the need for such material in the equilibrium mixture comprising that portion of the original mixture which is withdrawn from the fractionating zone below the level of the feed. Thus, substantially no part of the feed having the desired boiling range is withdrawn from the fractionating zone with the higher boiling or residual portions of the feed and the desired components are concentrated above the level at which said feed is admitted. When the desired distillate is a side stream fraction, loss of a portion of the same to lower boiling fractions, such as an overhead cut, is avoided by admitting to the fractionating zone, at a level above said side stream, a stream of fluid having approximately the boiling range of said side stream, to saturate said overhead with components having the boiling range of the side stream.

One application of the invention is in preparation of reactant hydrocarbons containing unsaturates for a polymerizing operation. In utilizing the aspects of the invention set forth above, either alone or in conjunction with one another, a fraction of the desired boiling range containing unsaturates and comprising a portion of a composite mixture of hydrocarbons having a relatively wide boiling range may be separated from said composite mixture, without being diverted to substantial extent into higher and/or lower boiling fractions obtained by fractionation of the composite mixture and thus be lost to the polymerization process.

Figure 2:
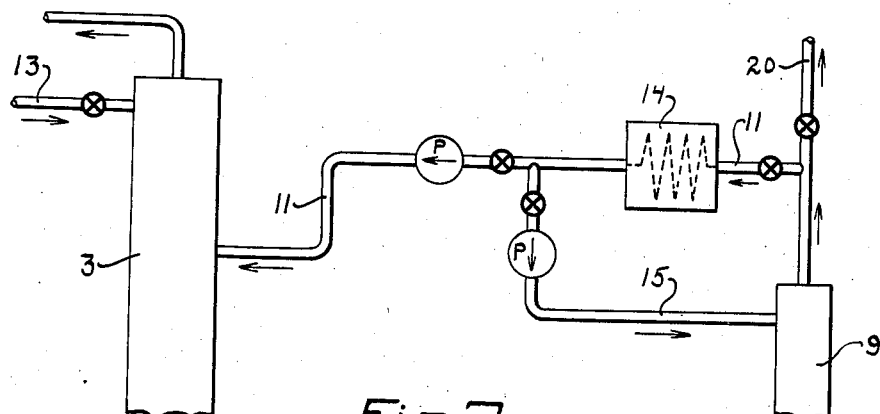

An illustrative and concrete embodiment of the invention is shown in the accompanying drawing in which:

Fig. 1 is a diagrammatic flow chart illustrating one advantageous manner of utilizing the invention, and Fig. 2 is a modification of a portion of Fig. 1.

In Fig. 1 a composite hydrocarbon mixture containing unsaturated hydrocarbons, which it is desired to polymerize, is admitted by line 4 to fractionator 3, from which a side stream distillate fraction having approximately the boiling range of and containing such unsaturates is withdrawn by line 5 and forced by pump 6 into polymerizing zone 7 containing any known or desired type of polymerization equipment, capable of effecting thermal or catalytic polymerization of the charge thereto. Suitable catalytic processes include the use of silicious adsorbent contact masses, such a naturally occurring, artifically prepared or synthetically produced silica or blends of silica and one or more oxides, such as alumina, at temperatures within the range of 50 to 700° F. When the selected charge to the polymerization zone is liquid, as when such charge is a side stream from fractionator 3, an advantageous catalytic polymerization process is a liquid phase operation utilizing a contact mass comprising a blend of silica and alumina at a temperature in the range of 50 to 300° F., or thereabouts, and operating pressures suitable for maintaining charge to the polymerization zone in liquid phase, substantially as described in the copending application of E. J. Houdry and J. P. Daugherty, Jr., Serial No. 109,680, filed November 7, 1936. The reaction products leaving the polymerizing zone by line 8 enter separator or fractionator 9 wherein they may be somewhat roughly separated or fractionated into a higher boiling cut comprising polymers and unreacted hydrocarbon charge and a lower boiling cut, comprised to a substantial extent of lower boiling unreacted or unpolymerized hydrocarbons and permissibly containing some hydrogen, methane, etc., which may occur in the products from some polymerizing operations. These two cuts or fractions may issue from fractionator 9 through lines 10 and 11, respectively. Cooling coil 12 provides control of the relative boiling ranges of the cuts in lines 10 and 11, while a suitable refluxing agent is added to fractionating column 3 by line 13.

According to the invention, the polymers containing dissolved unpolymerized hydrocarbons in line 10 may be conducted to fractionator 3 to enter the same at a level somewhat below the level of introduction thereto of the charge in line 4, as for example, below the feed plate in a conventional bubble tower. This cut has a boiling range, the lower portions of which are approximately the same as the lower portions of the boiling range of the hydrocarbon fraction or fractions, which drop below the level at which line 4 enters column 3, and saturates the last named fraction with components having about the same boiling range as the charge to the polymerization unit, thereby counteracting the tendency of the desired constituents of the charge to drop within the column. Likewise, the cut in line 11 may, where the same is desirable, be admitted to column 3 at a level above line 5, at which the boiling ranges of the cut and the contents of the column are approximately the same, which level is usually and preferably spaced from line 5. Such practice eliminates or minimizes the tendency of the fraction of the fresh charge containing the desired unsaturates to rise above the level or zone from which it is to be withdrawn.

In Fig. 2 the cut in line 11 is condensed in condenser 14 and a portion of the condensate is returned to column 9 by line 15 to serve as reflux, while the remainder of the condensate may be conducted to the appropriate level in column 3 to perform the function described above in connection with Fig. 1 and to augment the effect of or replace the refluxing material in line 13. Where a substantial or large proportion of the overhead or vapor fraction from fractionator or separator 9 is withdrawn from the system through line 20, it will be evident that all of the remainder of such fraction which is passed through condenser 14 may be desired as reflux in column 9, in which case none of this fraction will pass to fractionator 3.

Although the drawing shows a side stream being used as charge to the polymerization zone, such charge may be an overhead or vapor fraction leaving column 3 by line 21, for example.

The production of polymer gasoline from butylene and/or propylene is a typical application of the invention. Absorption gasoline and/or overhead from a debutanizing, stabilizing or depropanizing unit, or other suitable stream of hydrocarbons containing unsaturated or olefinic components of the three and four carbon groups may be charged to column 3 and a liquid or vaporous side stream or overhead fraction thereof, comprising essentially a propane, or a butane, or a combination cut and containing the desired unsaturates, may be charged to the polymerizing zone. The products from that zone may be separated to produce a bottoms or liquid gasoline cut containing butane, a small amount of propane and possibly some unpolymerized butylene and propylene, and a vapor or overhead cut comprised essentially of low boiling materials, propane and butane with possibly unconverted olefins in the three and four carbon groups. The return of any desired or required portion or all of the liquid cut to column 3, as by line 10, effects the desired concentration of propylene and/or butylene in the charge to the polymerization unit, and in addition, provides a single stream or blend of gasoline issuing from column 3 by line 16 which comprises polymer gasoline and that contained in the charge to that column. In the event that the charge to the polymerization zone is a side stream, the overhead or vapor cut produced from the above separation of reaction products is suitable for returning to column 3, as by line 11, to enhance the concentration of the propylene and/or butylene content of the original charge in the side stream; although, if the last mentioned cut is so employed, the normal practice is not to return more than a fraction thereof, the remainder being withdrawn through line 20 or returned to column 9, for example.

Although the preparation of starting material for the manufacture of polymer gasoline is herein utilized as an illustration of a practical application of the invention it is not the only process in which the invention finds use. Other processes include the derivation of a charge of predetermined or restricted boiling range containing unsaturated or olefinic hydrocarbons intended for use in any treatment or process for the manufacture of lubricating oils, alcohols or resinous materials. In some instances, as when the higher boiling portions of the original charge have chemical or physical properties which render them unsuitable for blending with the reaction products of the polymerizing zone, it is desirable to obtain suitable material for admission to fractionating column 3 adjacent or below the feed plate of the latter from another source, as by admitting such material to line 10 by valved line 17. In such cases the bottoms cut from tower 9 leaves the system by valved line 19. Likewise, the lower boiling fraction fed to column 3, as by line 11, may be replaced or augmented by hydrocarbons having desired boiling range characteristics derived from any suitable source and admitted to the system through valved line 18, while all or any desired portion of the overhead from column 9 may be discharged through valved line 20.

It is apparent from the above that the present invention provides for effective separation by fractional distillation of materials having a predetermined boiling range and containing reactants for a desired reaction from a composite mixture which includes such material, which separation is effected with a minimum loss of the desired reactants to other fraction or fractions resulting from the distillation.

I claim as my invention:

1. In the polymerization of unsaturated hydrocarbons, the process steps of admitting a hydrocarbon fluid containing unsaturates desired as charge for the polymerization reaction and higher boiling material to a fractionating zone, withdrawing from the latter a distillate fraction composed to substantial extent of said unsaturates, subjecting said unsaturates under polymerizing conditions to a polymerizing operation, separating from the resulting products a cut comprising polymers and an excess of hydrocarbons boiling within the boiling range of said distillate fraction, and feeding said cut to said fractionating zone at a level separate from but adjacent and below that for the admission of said fluid thereto, thereby simultaneously to blend said polymers with said higher boiling material and to minimize loss to the resulting fluid of desired unsaturates in the starting material.

2. In the polymerization of unsaturated hydrocarbons, the process steps of admitting to a fractionating zone a hydrocarbon fluid containing unsaturates desired as charge for the polymerization reaction and higher boiling material, withdrawing from said zone a side stream fraction composed to substantial extent of said unsaturates, subjecting said unsaturates under polymerizing conditions to a polymerizing operation, removing from the products of said polymerizing operation a cut containing hydrocarbons of approximately the boiling range of said unsaturates, and admitting said cut to said fractionating zone at a level above that for the withdrawal of said unsaturates.

3. In the polymerization of unsaturated hydrocarbons, the process steps of admitting to a fractionating zone a hydrocarbon fluid containing unsaturates desired as charge for the polymerization reaction and higher boiling material, withdrawing from said zone a side stream fraction composed to substantial extent of said unsaturates, subjecting said unsaturates under reaction conditions to a polymerizing operation, fractionating the products of said polymerizing operation to produce a liquid fraction having a boiling range the lower portion of which is approximately the same as the lower portion of the boiling range of the hydrocarbons in said fractionating zone below the level of admission thereto of said fluid and containing excess hydrocarbons having approximately the boiling range of said unsaturates and to produce a cut containing substantial amounts of hydrocarbons having approximately the boiling range of said unsaturates, feeding said liquid fraction to said fractionating zone at a level adjacent but below that for the admission of said fluid thereto, and admitting said cut to said fractionating zone at a level above that for the withdrawal of said unsaturates.

4. In the polymerization of unsaturated and normally gaseous hydrocarbons to produce motor fuel, the process steps of admitting a hydrocarbon fluid containing unsaturated hydrocarbons of the three and four carbon groups and higher boiling hydrocarbons to a fractionating zone, removing from the latter a side stream fraction comprised essentially of hydrocarbons in the three and four carbon group, subjecting said fraction under reaction conditions to a polymerizing operation, removing from the reaction products of said polymerizing operation a cut containing substantial amounts of material having approximately the boiling range of said fraction, and admitting said cut to said fractionating zone at a level above that for withdrawal of said fraction, thereby to minimize passage of unsaturates in said fluid above said level.

RAYMOND CHARLES LASSIAT.